(12) United States Patent
Nishio (10) Patent No.: US 7,924,462 B2
(45) Date of Patent: Apr. 12, 2011

(54) IMAGE PROCESSING APPARATUS, IMAGE PROCESSING METHOD AND IMAGE PROCESSING PROGRAM

(75) Inventor: Satoru Nishio, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 940 days.

(21) Appl. No.: 11/542,343

(22) Filed: Oct. 2, 2006

(65) Prior Publication Data

US 2007/0085916 A1 Apr. 19, 2007

(30) Foreign Application Priority Data

Sep. 30, 2005 (JP) ................. P2005-286237
Nov. 25, 2005 (JP) ................. P2005-339855

(51) Int. Cl.
*G06K 15/00* (2006.01)
*H04N 1/46* (2006.01)
*H04N 1/407* (2006.01)
*H04N 1/409* (2006.01)
*G06T 5/00* (2006.01)
*G03F 3/08* (2006.01)

(52) U.S. Cl. ....... 358/2.1; 358/3.01; 358/3.26; 358/515; 358/518; 358/523; 358/461

(58) Field of Classification Search .......... 358/1.9, 358/2.99, 518, 520, 527, 529, 538, 2.1, 3.01, 358/3.26, 461, 515, 523; 345/600; 382/167; 348/241

See application file for complete search history.

(56) References Cited

U.S. PATENT DOCUMENTS

| 6,847,377 | B2 | 1/2005 | Kitahara et al. |
| 2003/0234879 | A1* | 12/2003 | Whitman et al. ............. 348/242 |
| 2004/0028271 | A1* | 2/2004 | Pollard et al. ................. 382/162 |
| 2004/0109068 | A1* | 6/2004 | Mitsunaga et al. ........ 348/222.1 |
| 2004/0169751 | A1 | 9/2004 | Takemura et al. |
| 2005/0007626 | A1* | 1/2005 | Takaiwa ....................... 358/1.15 |
| 2005/0163370 | A1* | 7/2005 | Minakuti et al. ............. 382/167 |
| 2009/0051781 | A1 | 2/2009 | Takemura et al. |

FOREIGN PATENT DOCUMENTS

| CN | 1379584 A | 11/2002 |
| CN | 1645903 A | 7/2005 |
| JP | 2000-232618 A | 8/2000 |
| JP | A-2004-248061 | 9/2004 |
| JP | 2005-033468 | 3/2005 |

OTHER PUBLICATIONS

European Search Report dated Jan. 22, 2008.
Canon, "Digital Photo Professional (DPP)," XP-002430195 (2004).

* cited by examiner

*Primary Examiner* — James A Thompson
(74) *Attorney, Agent, or Firm* — Nutter McClennen & Fish LLP; John J. Penny, Jr.

(57) ABSTRACT

Input unit inputs RAW data. Print data generating unit generates print data from an image to be printed. The print data allows a print unit to print the image to be printed. Correct unit sets a color balance operation value or a luminance operation value based on the RAW data, and enforces a color balance correction corresponding to the color balance operation value or a luminance correction corresponding to the luminance operation value on the RAW data. Image generating unit generates an image as the image to be printed from the RAW data with the color balance correction or the luminance correction enforced thereon using a demosaicking processing and a tone reproduction processing.

3 Claims, 6 Drawing Sheets

| $R_0$ | $G_{01}$ | $R_1$ | $G_{11}$ |
|---|---|---|---|
| $G_{02}$ | $B_0$ | $G_{12}$ | $B_1$ |
| $R_2$ | $G_{21}$ | $R_3$ | $G_{31}$ |
| $G_{22}$ | $B_2$ | $G_{32}$ | $B_3$ |
| $R_4$ | $G_{41}$ | $R_5$ | $G_{51}$ |
| $G_{42}$ | $B_4$ | $G_{52}$ | $B_5$ |

FIG. 3B $P_0 (R_0, G_{01}, B_0)$ $P_2 (R_0, G_{02}, B_0)$

|  | $P_0$ |  | $P_1$ |
|---|---|---|---|
| $P_2$ |  | $P_3$ |  |
|  | $P_4$ |  | $P_5$ |
| $P_6$ |  | $P_7$ |  |
|  | $P_8$ |  | $P_9$ |
| $P_{10}$ |  | $P_{11}$ |  |

IMAGE PROCESSING APPARATUS, IMAGE PROCESSING METHOD AND IMAGE PROCESSING PROGRAM

BACKGROUND OF THE INVENTION

The present invention relates to an image processing apparatus, an image processing method and an image processing program and, more specifically, the invention relates to the printing of RAW data.

Conventionally, as a data record format for an image input apparatus such as a digital camera, there is known an RAW data format in which an output value from a color image sensor is AD converted and recorded (see Japanese Patent Publication No. 2005-33468). The color image sensor, normally, carries thereon any one of color filters for R (red), G (green) and B (blue) for each pixel and, therefore, RAW data having only one color component for each pixel is incomplete information as an image representing an object. For this reason, until a demosaicking processing (this is also referred to as a color filter arrangement interpolating processing in which color information lacking in each pixel is calculated and generated and the color data of each pixel are reproduced to thereby complete the object as an image) for interpolating at least the lacking color component of each pixel by the color component of its adjoining pixel is enforced on the RAW data, an image representing the object cannot be printed.

In a conventional system in which a PC and a printer are combined together, the RAW data is outputted to a printer driver after an optical black compensation processing, a demosaicking processing, a white balance correction, an EV correction, a tone reproduction and the like are enforced on the RAW data by a so called development application, and then the RAW data are converted to print data by the printer driver. The EV correction and the white balance correction to be executed by the development application are linear transformations in which the RAW data (which are unprocessed output values from the image sensor) are multiplied by a given coefficient. On the other hand, the brightness perceived by human beings does not correspond to the luminance that is the measured quantity of the photometry of the image sensor and thus, generally, when the image is outputted there is enforced a toner reproduction processing which is a non-linear transformation processing. Most of printer drivers have a function to enforce an automatic color balance correction or an automatic luminance correction on an image to be printed in order to be able to obtain the most desirable output in their corresponding printers, for example, an auto-photo fine (which is a registered trade mark) function provided by Seiko Epson Co. However, in the prior art, there has been found a problem that, after the tone reproduction processing (which is a non-linear processing) is enforced on the image, in order to be able to obtain a high precision correction result by correcting the color balance or luminance of the image, a complicated calculating processing must be carried out. Also, since the image, after the demosaicking processing is enforced thereon, is to be processed, when compared with a case where the RAW data are to be processed, the quantity of data is large. Further, the white balance-related and EV correction-related processings are enforced by the development application and printer driver, with the result that the time necessary for the processings increases.

SUMMARY OF THE INVENTION

It is therefore an object of the invention to provide an image processing apparatus, an image processing method and an image processing program which are capable of printing a high quality image at a high speed from the RAW data.

In order to achieve the above object, according to the invention, there is provided an image processing apparatus, comprising:

input unit that inputs RAW data;

print data generating unit that generates print data from an image to be printed, the print data allowing a print unit to print the image to be printed;

correct unit that sets a color balance operation value or a luminance operation value based on the RAW data, and enforces a color balance correction corresponding to the color balance operation value or a luminance correction corresponding to the luminance operation value on the RAW data; and image generating unit that generates an image as the image to be printed from the RAW data with the color balance correction or the luminance correction enforced thereon using a demosaicking processing and a tone reproduction processing.

In the structure in which the color balance correction processing or luminance correction processing is enforced prior to execution of the demosaicking processing, the quantity of data to be corrected is one third when compared with a structure in which the color balance correction processing or luminance correction processing is enforced after the demosaicking processing. Therefore, the color balance correction processing and luminance correction processing can be enforced at a high speed. By enforcing the color balance correction processing and luminance correction processing before a tone reproduction processing in which a non-linear transformation is executed, the color balance characteristic and lightness characteristic of RAW data to be printed can be corrected using a simple processing, which makes it possible to print images of high quality.

The image generating unit may generates an intermediate image using the demosaicking processing and the tone reproduction processing and then generates an image as the image to be printed from the intermediate image using a subtractive processing.

When compared with a case in which a color balance correction or a luminance correction is enforced after the RAW data are color subtracted, a case in which the color balance correction or luminance correction is enforced before the RAW data are color subtracted can provide a high quality printed image the luminance and color balance of which are corrected to the desired luminance and color balance, because the correction can be made while the tone of the image is not lost by saturation even when the exposure and color balance of the image deviate greatly from their proper ranges (a so called failure picture).

The input unit may input the RAW data and the image to be printed; the image generating unit may inform the print data generating unit that the color balance correction or the luminance correction has been enforced; and, the print data generating unit, when the color balance correction or the luminance correction has not been enforced, may sets a second color balance operation value or a second luminance operation value based on the image to be printed and may enforce a color balance correction corresponding to the second color balance operation value or a luminance correction corresponding to the second luminance operation value on the image to be printed.

According to this structure, the image generating unit informs the print data generating unit that the color balance correction or luminance correction has been enforced. This can prevent the deterioration of the image quality and an increase in the processing time which can be otherwise caused by the double enforcement of the color balance correction or luminance correction by the print data generating unit. In the structure in which the print data generating unit, when a color balance correction or a luminance correction has not been enforced, sets a second color balance operation value or a second luminance operation value based on the image to be printed and enforces a color balance correction or a luminance correction on the image to be printed, if the color balance correction or the luminance correction has been enforced, the print data generating unit does not enforce a color correction or a luminance correction on the image to be printed and, therefore, it is possible to use in common the print data generating unit in the image processing apparatus in which the RAW data and image to be printed are inputted by the input unit. As a result of this, the time for development of the image processing apparatus can be shortened and thus the developing and manufacturing costs of the image processing apparatus can be reduced.

The image to be printed may be an image which is compressed according to the JPEG method. Since the JPEG method is a standard file method for a digital camera, it can be widely used in various machines.

The image generating unit may record the completion of the enforcement of the color balance correction or the luminance correction as the attribute information of the image to be printed to thereby transmitting the attribute information to the print data generating unit.

According to the invention, there is also provided an image processing method, comprising:
  inputting RAW data;
  generating print data from an image to be printed, the print data allowing a print unit to print the image to be printed;
  setting a color balance operation value or a luminance operation value based on the RAW data, and enforcing a color balance correction corresponding to the color balance operation value or a luminance correction corresponding to the luminance operation value on the RAW data; and generating an image as the image to be printed from the RAW data with the color balance correction or the luminance correction enforced thereon using a demosaicking processing or a tone reproduction processing.

In the structure in which the color balance correction processing or luminance correction processing is enforced before the demosaicking processing, the quantity of data to be corrected is one third when compared with a structure in which the color balance correction processing or luminance correction processing is enforced after the demosaicking processing. Therefore, the color balance correction processing and luminance correction processing can be enforced at a high speed. By enforcing the color balance correction processing and luminance correction processing before a tone reproduction processing in which a non-linear transformation is executed, the color balance characteristic and lightness characteristic of the RAW data to be printed can be corrected using a simple processing, which makes it possible to print images of high quality.

According to the invention, there is also provided an image processing program for operating a computer, comprising:
  input unit that inputs RAW data;
  print data generating unit that generates print data from an image to be printed, the print data allowing a print unit to print the image to be printed;
  correct unit that sets a color balance operation value or a luminance operation value based on the RAW data, and enforces a color balance correction corresponding to the color balance operation value or a luminance correction corresponding to the luminance operation value on the RAW data; and
  image generating unit that generates an image as the image to be printed from the RAW data with the color balance correction or the luminance correction enforced thereon using a demosaicking processing or a tone reproduction processing.

In the structure in which the color balance correction processing or luminance correction processing is enforced before the demosaicking processing, the quantity of data to be corrected is one third when compared with a structure in which the color balance correction processing or luminance correction processing is enforced after the demosaicking processing. Therefore, the color balance correction processing and luminance correction processing can be enforced at a high speed. By enforcing the color balance correction processing and luminance correction processing before a tone reproduction processing in which a non-linear transformation is executed, the color balance characteristic and lightness characteristic of the RAW data to be printed can be corrected using a simple processing, which makes it possible to print images of high quality.

By the way, the respective functions of two or more units provided in the present invention can be realized by hardware resources the functions of which are specified by their structures themselves, by hardware resources the functions of which are specified by a program, or by a combination of them. Also, the respective functions of these two or more units are not limited to those that can be realized by hardware resources which are physically independent of each other. And, the present invention not only can be specified as an invention of an apparatus but also can be specified as an invention of a program, an invention of a recording medium with the program recorded therein, and as an invention of a method.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 2:
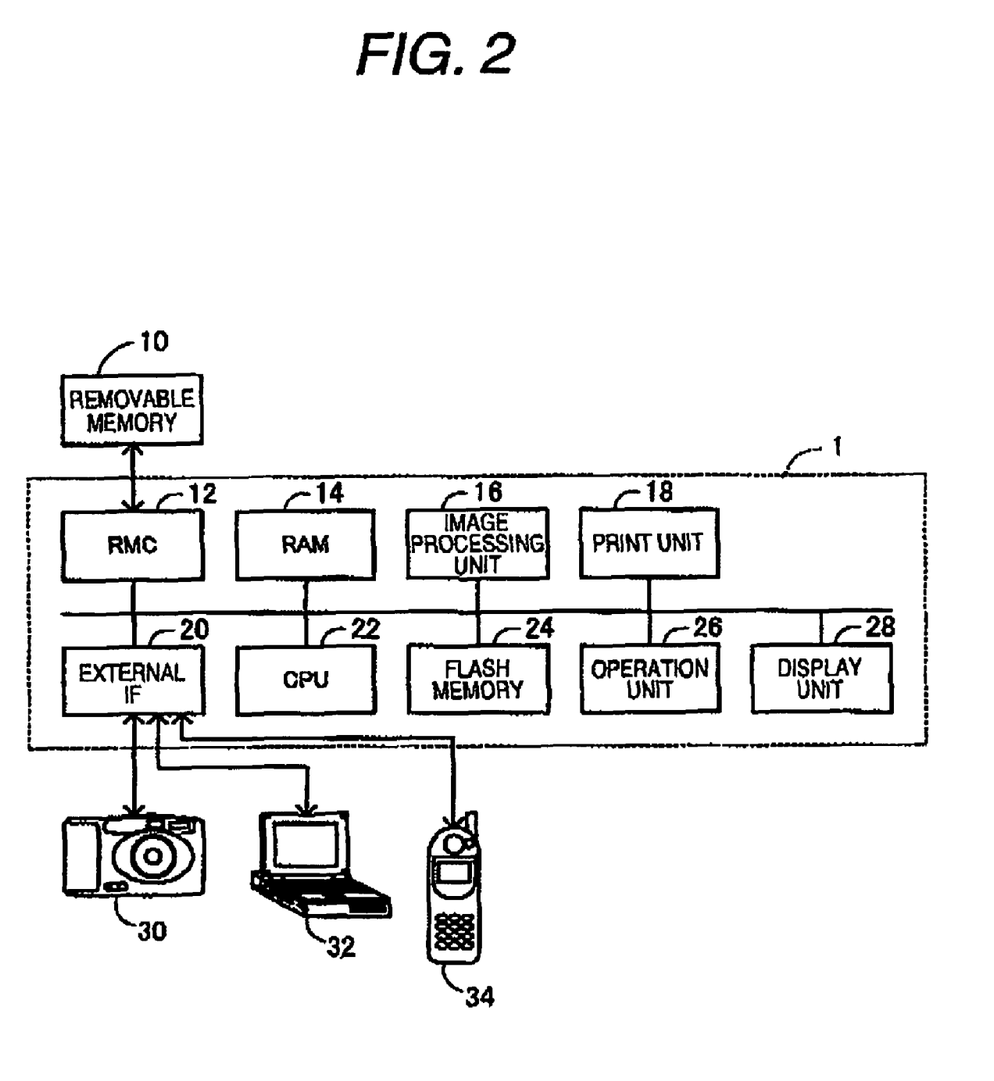
FIG. 2 is a block diagram of the schematic structure of a printer according to an embodiment of the invention.

Hereinafter, description will be given below in the following order of an embodiment in which the invention is applied to a printer of a stand-alone type with reference to the accompanying drawings.
  1. Structure of the printer
  2. Operation of the printer
  2-1. RAW data processing 2-2. Image print processing 1. Structure of the Printer FIG. 2 is a block diagram of the schematic structure of a printer 1 to which the invention is applied. The printer 1 is a so called stand-alone type of printer which can read RAW data and images arranged in a general-purpose format from a removable memory 10 and can execute a printing operation based on these data. Also, the printer 1 can input therein RAW data and images arranged in a general-purpose format directly from an external system such as a digital camera 30, a PC (Personal Computer) 32, and a portable telephone terminal with a camera 34 and is capable of printing based on these images.

An external IF (Inter Face) 20 acting as input means includes a USB controller, a USB connector and the like which are used to communicate with the external systems such as the digital camera 30, PC (Personal Computer) 32 and portable telephone terminal with a camera 34. The communication standard is not limited to the USB but there can be used any standard such as the IEEE 1394 and an infrared ray. Also, if the external IF 20 includes a USB host function, when the external system corresponds to a USB mass storage standard, the printer is able to input and output data with respect to a storage medium belonging to the external system. When there is provided a storage medium such as a hard disk used in common within a LAN to which the printer 1 is connected as well, the printer 1 is capable of inputting and outputting data with respect to a storage medium under the control of the external system. In other words, even in the case of a storage medium under the control of the external system, the printer 1 can store images generated from the RAW data into the storage medium provisionally, and can read the images therefrom for printing. And, the printer 1 itself can also be provided with a hard disk device and the storage capacity of the printer 1 can be thereby increased.

A removable memory controller (RMC) 12 acting as input means is connected to the removable memory 10 and controls data transfer between the removable memory 10 and RAM 14. The removable memory 10 may be a card type flash memory or may be any other nonvolatile storage medium capable of repetitive writing.

An image processing unit 16 serving as print data generating means and image generating means is an ASIC which is used to execute an image correction processing such as a sharpness correction processing and a tone correction processing, an impression dividing processing, a half toning processing, an interlace processing and other similar processings at high speeds. By the way, these processings may also be executed according to a program processing using a CPU 22. Also, a JPEG compress/expand function may be added to the image processing unit 16 to thereby speed up the JPEG compress/expand processing.

A print unit 18 includes a recording head for forming images on paper according to an ink jet method based on print data, a mechanism for shuttling the recording head, and a paper feed and discharge mechanism and the like. By the way, as a printing method, there can be employed any one of printing methods such as an ink jet method, a laser method, a thermal method and a dot impact method.

The RAM 14 is a volatile memory for provisionally storing therein a control program and data to the processed by the control program, for example, RAW data, images, and print data.

The CPU 22, which serves as the print data generating means, correcting means and image generating means, executes a control program stored in a flash memory 24 to thereby carry out a processing for generating images from the RAW data using demosaicking processing, executes the JPEG compress/expand processing, and controls the respective parts of the printer 1 to thereby control the execution of printing. The control program may be transferred from a computer readable storage medium to the flash memory 24 or may be transferred from a remote server through a network to the flash memory 24.

An operation unit 26 includes an operation button for receiving the menu operation and printing requirement of a user, a jog dial, and other various buttons. When a specific button is depressed in a specific mode, various requirements according to the mode are input into the printer 1.

A display unit 28 includes an FPD (Flat Panel Display) such as an LCD, a graphic controller and the like. A frame memory area may be secured in an exclusive memory in the display unit 28 or may be allocated to a partial area of the RAM 14.

2. Operation of the Printer

Figure 1:
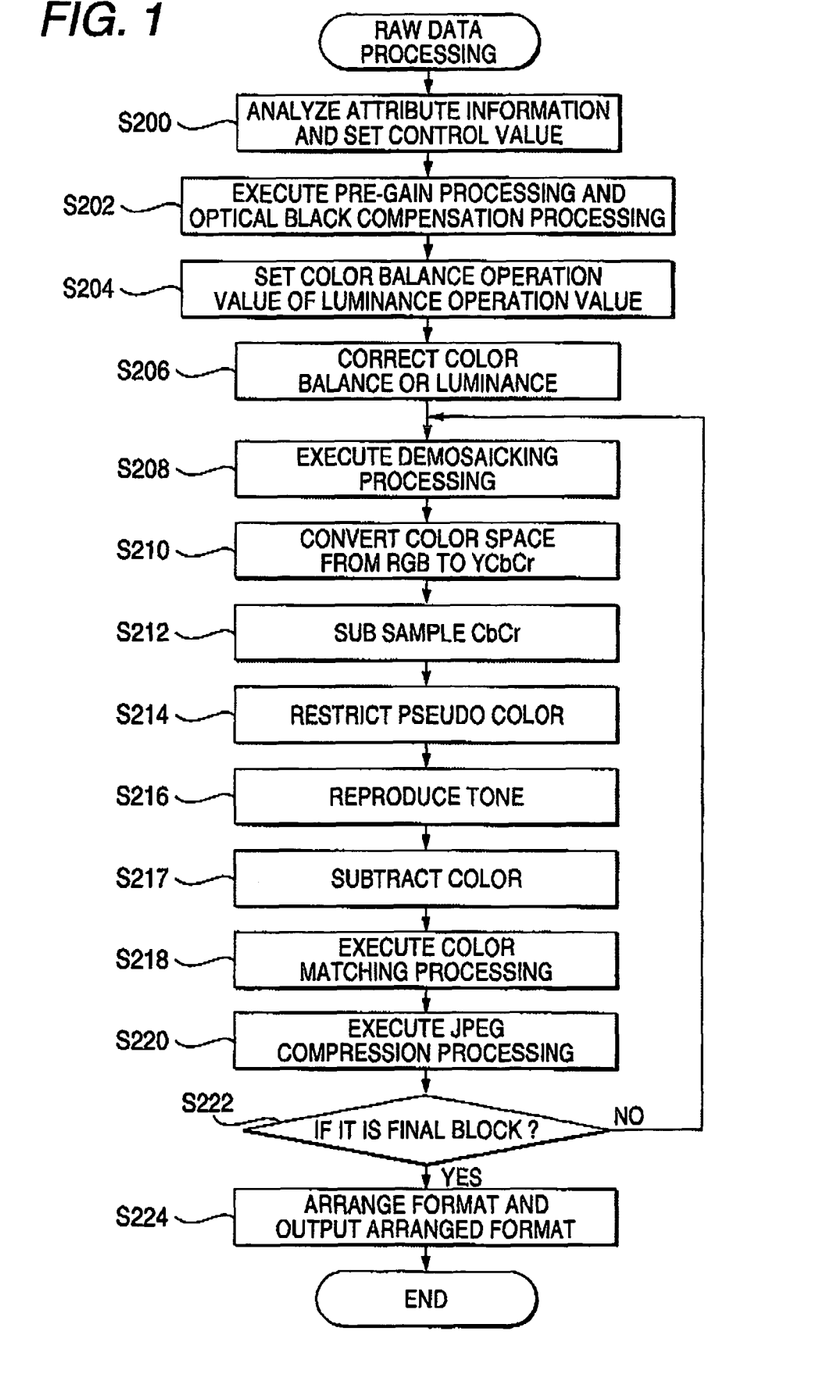
FIG. 1 is a flow chart of the operation of a printer according to an embodiment of the invention.
Figure 4:
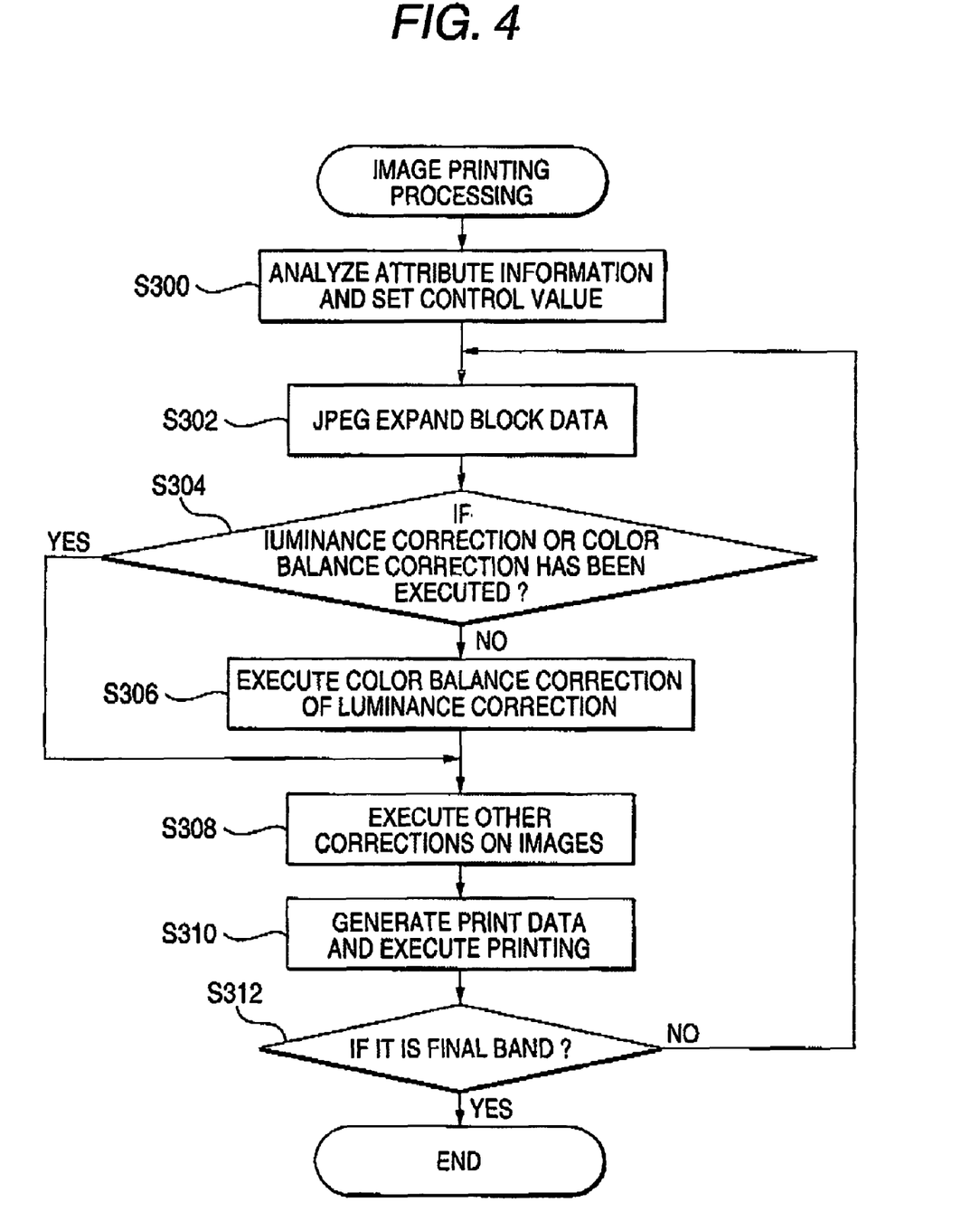
FIG. 4 is a flow chart of the operation of a printer according to an embodiment of the invention.

FIGS. 1 and 4 are respectively flow charts of the operation of the printer 1. Processings shown in FIGS. 1 and 4 can be started in the order of FIG. 1 and FIG. 4 when, while an automatic image correction function by the printer is on, a RAW data file is selected as an object to be printed by a user and a print start is instructed by the user. The printer 1 reads therein RAW data from the removable memory 10, generates images to be printed for a general-purpose format from the RAW data, stores the thus generated images to be printed into the removable memory 10, and reads the general-purpose format images to be printed generated by the printer itself from the removable memory 10, thereby executing the printing of the images.

The automatic image correction function by the printer is a function by which, for example, even in the case of a failure picture caused by wrong exposure setting when the picture was taken, the printer can analyze the images of the picture, can set an operation value fit for the characteristics of the printer so as to be able to change the images to desirable images, and can enforce a correction on the images based on the operation value. The automatic image correction function includes a luminance correction, a color balance correction, a contrast correction, a sharpness correction, a memory color correction, a color saturation correction and the like. This function can be turned on or off when a user operates a printer setting menu displayed on the display unit 28 by actuating an operation button, a jog dial or the like provided on the operation unit 26.

At a stage to select a file to be printed, in order to guide the selection of the file to be printed to the user, thumb nail images, reduced images of a VGA size or the like stored in the RAW data file are displayed on the FPD. The images to be displayed can be specified by analyzing the file header. Unless images are stored in the RAW data file (in the present specification, description is given assuming that the RAW data are not images), the printer 1 may generate reduced images of a VGA size or so according to a high speed algorithmic technique. Specifically, for example, by generating an image having a resolution half the RAW data in each of the vertical and horizontal directions, the demosaicking processing can be speeded up, or, by omitting a while balance correction processing, a luminance correction processing, a pseudo color restrict processing and the like, the generation of the reduced images can be speeded up.

By the way, referring to the format of images to be printed that is handled in the process where the printer 1 prints images according to the RAW data, a JPEG format is used in the description of the present embodiment but this is not limitative. According to the invention, there can be used other general-purpose formats such as a JPEG 2000 format, a BMP type JPEG format, a TIFF type JPEG format, a JFIF type JPEG format, or there can also be used a format which is optimized by sacrificing the general purpose characteristic thereof.

When a print request occurs, there are executed a RAW data processing and an image print processing which will be respectively discussed below in detail. The print request can be generated when a previously set given button is depressed. When the print request is generated, the printer 1 checks whether the removable memory 10 is in a writable state or not. When the removable memory 10 is not in a writable state, or when the spare capacity of the removable memory 10 is small, the printer may also inform the user to that effect.

The CPU 22, when the print request occurs, may start the blinking operation of an access indicator (not shown). The blinking operation of the access indicator continues until the printing operation is ended. During execution of the printing operation, the printer 1 reads therein the RAW data and the images to be printed from the removable memory 10 as well as writes the images to be printed into the removable memory 10. Therefore, if the removable memory 10 is removed from the RMC 12 during execution of the printing operation, there is a possibility that the images to be printed can be left in the removable memory 10 or the processing of the printer can be out of control. In other words, to blink the access indicator during execution of the printing operation can prevent the occurrence of malfunctions which incur the above problems.

Also, the printer 1 may also start a processing for guiding the print progress state to the user, for example, by displaying a progress bar on the FPD. The display of the print progress state continues until the end of the printing operation. This is because, unless the print progress state is displayed, the user can misunderstand that a system error has occurred. Normally, because the processing speed of the CPU 22 is slow due to the restriction of the manufacturing cost thereof, the printer 1 takes several minutes to generate the images from the RAW data.

2-1. RAW Data Processing

FIG. 1 is a flow chart of the flow of a RAW data processing.

In Step S200, the CPU 22 analyzes the attribute information on the RAW data file to be printed to specify the manufacturer of a digital camera, the model of the digital camera, photography information (photographing date, stop, shutter speed and the like), print control information, development control information and the like. The print control information includes print size specification, print number specification, image correction control information to obtain a desired print result, and the like. In order to transmit the print size specification and print number specification from the digital camera to the printer, there may also be used a DPOF (Digital Print Order Format). As a standard to transmit the image correction control information for a desired print result from the digital camera to the printer, there are well known PIM (PRINT Image Matching) and Exif Ver2.2. The development control information includes a sharpness operation value to recover the lowered sharpness due to a low pass filter, optical black information, gain information for each color component, luminance correction information, the arrangement information of the color filters of an area image sensor, color matching information from a device color space to an sRGB color space or the like, gamma correction information, and the like. The development control information is peculiar to each digital camera and is not made public generally, but it can be specified by analyzing the file header. Also, as a general-purpose standard for the development control information, there is proposed a DNG.

In Step S202, the CPU 22 executes a pre-gain processing and an optical black compensation processing respectively based on the pre-gain information and the optical black information. In the pre-gain processing, based on the pre-gain information obtained from the file header, all pixel values of the RAW data are amplified linearly. The optical black information expresses the quantity of charges accumulated in a light receiving element which is disposed in the image sensor of an image input device and also which does not allow the incidence of light. In the optical black compensation processing, a value provided by the optical black information obtained from the file header is regarded as black, and the value provided by the optical black information is subtracted from the all pixel value of the RAW data.

Figure 3A:
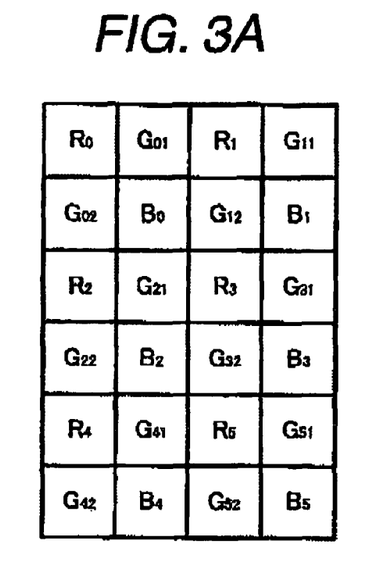
FIG. 3A is a typical view of an embodiment according to the invention.
Figure 3B:
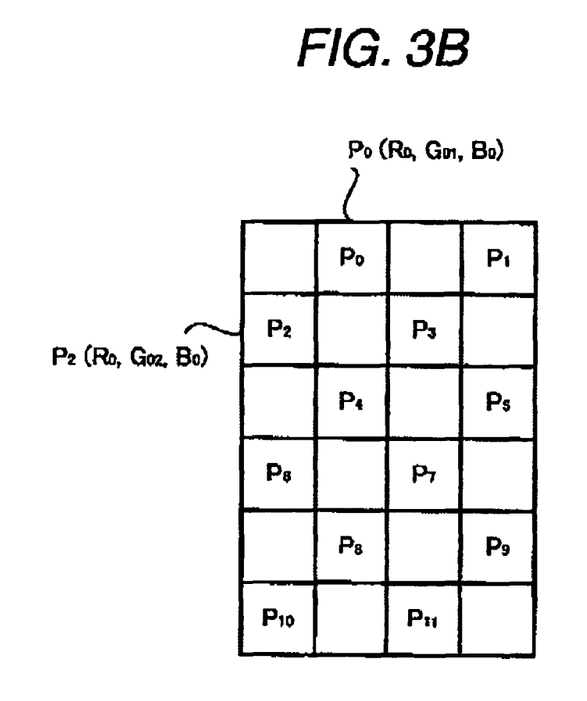
FIG. 3B is a typical view of an embodiment according to the invention.

In Step S204, the CPU 22 sets a color balance operation value or a luminance operation value. The spectral radiation energy distribution of an object naturally varies according to the illumination environments, whereas human beings perceive the color of the same object as the same color even when the illumination environments vary. This tendency is referred to as the permanent property (color constancy) of a color. On the other hand, the image sensor accumulates charges corresponding to the respective color components (in the present embodiment, they are discussed in the form of RGB) in a balance according to the spectral radiation energy distribution of an object. Therefore, for example, in order that an object to be perceived as white in the daytime outdoors in fine weather can be expressed by white pixels, there is necessary a color balance correction which corrects the color balances of the respective components of RGB. This color balance correction is a white balance correction. The CPU 22 sets color balance operation values and luminance operation values with respect to the respective RGB components. Specifically, for example, when the respective pixels of the RAW data are arranged in such a manner as shown in FIG. 3A, the CPU 22 generates an image to be analyzed which is obtained by converting pixels corresponding to the four pixels of the RAW data into two pixels containing such three RGB components as shown in FIG. 3B. For example, $P_0$ expresses a pixel which has three components ($R_0$, $G_{0\,1}$, and $B_0$) and $P_2$ expresses a pixel having three components ($R_0$, $G_{0\,2}$, and $B_0$). Using the image to be analyzed, the number of pixels of which is half that of the RAW data, the CPU 22 sets the color balance operation value and luminance operation value. With respect to the color balance correction, there are known various algorithms. For example, the state of the distribution of the respective pixels of the image to be analyzed within the RGB space is analyzed to set an operation value relating to the respective RGB components in such a manner that a group of pixels assumed to be an achromatic color can provide an achromatic color. For the luminance correction, according to the histogram of the luminance components of the respective pixels, there is set as a luminance operation value a value by which the luminance components of the respective pixels are multiplied Also, a value, by which the respective RGB components are multiplied, may be the luminance operation value. By the way, the color balance operation value may also be set in such a manner that the gain information for each RGB stored as the development control information on the RAW data is further added thereto. With regards to the luminance operation value as well, there may be further added the luminance correction information stored as the development control information on the RAW data. When the analyzed results of the RAW data show that the enforcement of the luminance correction is not necessary, for example, the luminance operation value may be set for 0 and thus the luminance correction may not be enforced.

Also, the color balance operation value and luminance operation value may also be set with the characteristics of the printer 1 added thereto. The characteristics of the printer 1 are those which depend, for example, on the kind of ink and a printing method used in the print unit 18, and on the various image processing methods of the image processing unit 16. Also, for example, when there are available color balance correction information and luminance correction information stored as correction control information in order to obtain the desired print results of the RAW data, they may also be referred to.

In Step S206, the CPU 22 enforces a color balance correction and a luminance correction. Specifically, based on the color balance operation value and luminance operation value set in Step S204, the color balance correction and luminance correction are enforced on the RGB data. In the color balance correction, using operation values (gain information) set for each of the RGB components, the respective RGB components are basically multiplied by a constant. In the luminance correction, the luminance components may be multiplied by a constant to thereby correct the luminance, or the color components may be multiplied by a constant to thereby correct the luminance. In order to restrict tone saturation, the color balance correction and luminance correction may also be a non-linear processing in which the tone is compressed by a highlight band. Also, the color balance correction and luminance correction may also be executed at a time using a matrix or an LUT which defines the correspondence relationship between inputs and outputs. In this case, in order that a numeric expression, matrix or LUT used for the color balance correction or luminance correction can be defined in only one meaning, two or more numeric expressions, matrixes or LUTs must have been previously stored in the flash memory 24.

Here, of the above-mentioned automatic image correction function to be fulfilled by the printer, the color balance correction or luminance correction is enforced on the RAW data. By enforcing the color balance correction or luminance correction before the demosaicking processing, when compared with a case in which such correction is executed after the demosaicking processing, as will be discussed later, the quantity of data to be analyzed is one half and the quantity of data to be corrected is one third; and thus, the color balance correction or luminance correction can be executed at a high speed.

Processings in Steps from S208 to S220 are executed in a block unit. That is, after the RAW data are read from the removable memory 10 into the CPU 22 and the processed results thereof are stored into the RAM 14. After the processings in Steps from S200 to S206 are executed, in the following steps, data in a block to be processed are read from the RAM 14 into the CPU 22 and the processed results thereof are stored into the RAM 14. In a JPEG format which samples YCbCr according to a 422 method, images are encoded in every block composed of 8 pixels×16 pixels. Therefore, the vertical direction width of the block is set for 8 pixels or integer multiples of 8 pixels, while the horizontal direction width of the block is set for 16 pixels or integer multiples of 16 pixels.

Figure 5:
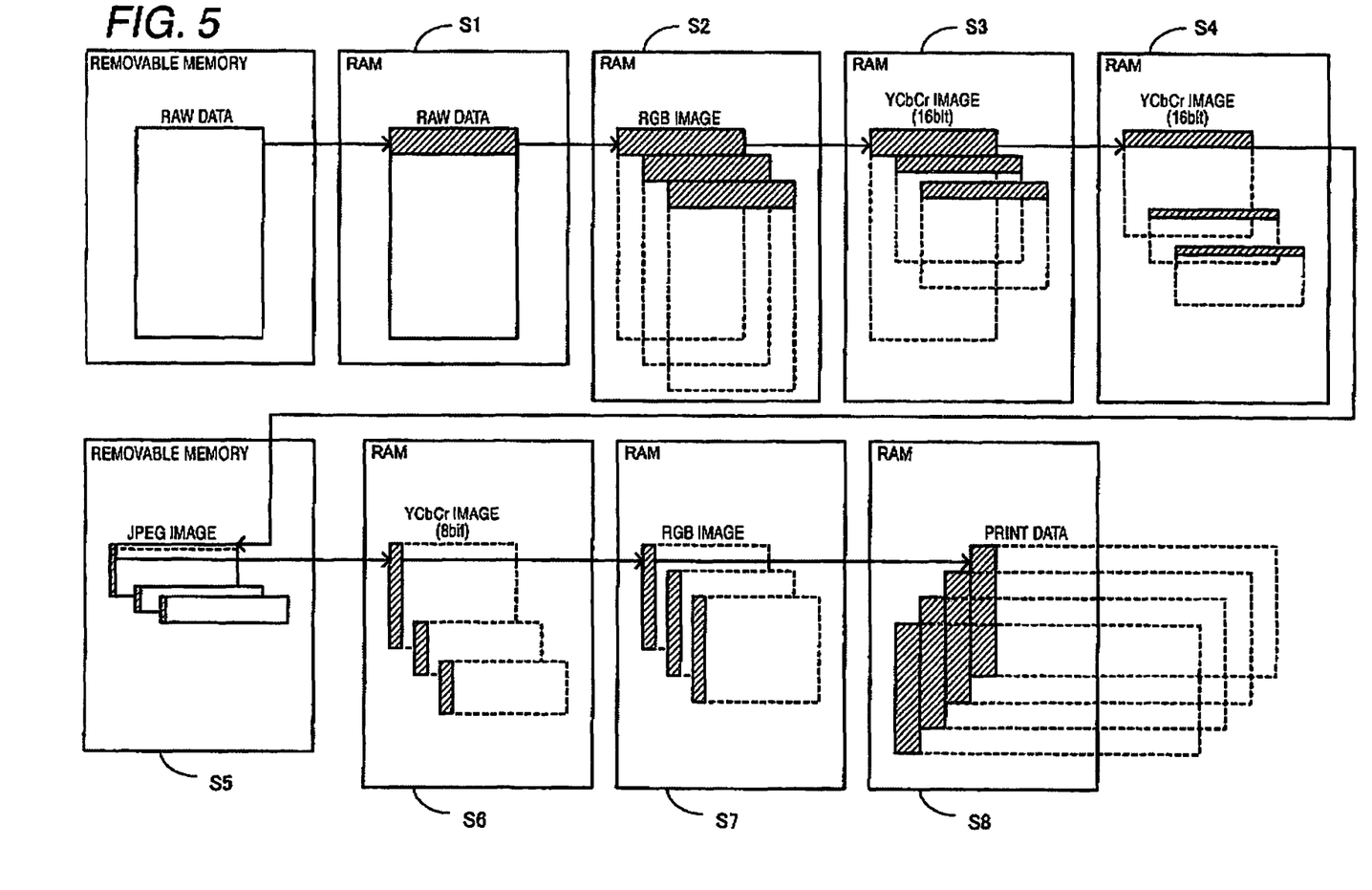
FIG. 5 is a typical view of an embodiment according to the invention.

FIG. 5 is a typical view to show how data in a block to be processed are held by the RAM 14 until print data are generated from the RAW data. A solid line expresses a data size which occupies a memory space statically, while a hatching expresses the size of data in a block to be processed. A broken line expresses the size of a memory space which is accumulatively necessary for processing the whole RAW data. By the way, in the present embodiment, description is given assuming that the RAW data are an expression for 16 bits.

In Step S208, the CPU 22 carries out a demosaicking processing corresponding to the arrangement of the color filter of the area image sensor. The demosaicking processing is a processing in which mutually adjoining pixels each basically having a color component (for example, any one of R, G and B) per pixel are allowed to compensate their lacking components with each other. As a result of this, the size of the data block to be provisionally held by the RAM 14, as shown in S2 in FIG. 2, is three times when compared with the size before the processing (S1).

As described above, the present embodiment is structured such that, prior to execution of the demosaicking processing, a color balance correction or a luminance correction is carried out (Steps S204, S206); and, therefore, when compared with a case in which a color balance correction or a luminance correction is carried out after execution of the demosaicking processing, the quantity of data to be analyzed is one half and the quantity of data to be corrected is one third, which makes it possible to enforce the color balance correction and luminance correction at a high speed.

In Step S210, the CPU 22 carries out a color space conversion from the RGB color space to the YCbCr color space. Before and after execution of the processing in Step S210, the size of the data to be provisionally held by the RAM 14 does not vary.

In Step S212, the CPU 22 executes a sub sampling operation according to the 422 method. That is, the Y component is sampled in 16 bits and, for the Cb component and Cr component, the mean value in every two adjoining pixels is sampled in 16 bits. As a result of this, the size of data to be provisionally held by the RAM 14, as shown in S3 in FIG. 5, is two thirds when compared with the size before execution of the processing.

In Step S214, the CPU 22 executes a pseudo color restrict processing. In an area image sensor including a color filter of a Bayer arrangement, since the number of light receiving elements for G is double the number of light receiving elements for R and B, aliasing is easy to occur in the R and B components. A pseudo color generated due to the aliasing is restricted by a smoothing processing using a median filter or the like.

In Step S216, the CPU 22 carries out a tone reproduction processing. The brightness to be perceived by human beings does not correspond to the luminance that is the photometric quantity of the image sensor. Generally, the luminance is converted in a non-linear manner according to the Weber/Fechner hypothesis insisting that the perception quantity is proportional to the logarithm of the stimulation quantity. By the way, in order to avoid a tone loss owing to saturation, there can also be executed a transformation which restricts gradually the tone in a high light region and in a shadow region. The transformation is carried out, for example, using an LUT that is defined optimally for each mode of a digital camera. By the way, the image, on which the demosaicking processing and tone reproduction processing have been enforced, corresponds to an intermediate image set forth in the appended claims.

Since the color balance correction and luminance correction are enforced prior to execution of the tone reproduction processing in which the non-linear transformation is executed, the color balance characteristic and lightness characteristic of the RAW data can be corrected by a simple processing and thus an image of high quality can be printed.

In Step S217, the CPU 22 carries out a subtractive processing. Specifically, the respective components of the YCbCr are color subtracted from 16 bits to 8 bits. As a result of this, the size of block data to be dynamically held by the RAM 14, as shown in S4 in FIG. 5, is one half when compared with the size of the block data before enforcement of the subtractive processing.

When compared with a case in which the color balance correction and luminance correction are executed after enforcement of the subtractive processing, the execution of the color balance correction and luminance correction prior to the execution of the color subtraction processing, for example, even when the exposure and color balance vary from the desired conditions thereof (a so called failure picture), can restrict the tone more smoothly in the high light region and in the shadow region and thus the color balance and luminance can be corrected without losing the tone due to saturation. As a result of this, there can be obtained a high quality print result in which the luminance and color balance of images have been corrected to the proper luminance and color balance.

In Step S218, the CPU 22 executes a color matching processing. Because the values of the respective color components of the RAW data depend on the spectral sensitivity of an image sensor provided in an image input device, they do not correspond to tristimulus values specified by a general-purpose standard such as the sRGB. The color matching processing is a processing in which color lights represented by input values, that is, the RAW data are expressed by stimulus values specified by the general-purpose standard such as the sRGB. Specifically, pixel values are transformed using a 3×3 matrix operation or a three-dimension LUT (Look Up Table). The matrix or three-dimension LUT used in this transformation can be obtained from the file header as development control information, or a matrix or a tree-dimension LUT, which has been previously defined according to the model of a digital camera or the like, may be applied according to model information obtained from the file header. Before and after execution of the processing in Step S218, the size of block data to be held by the RAM 14 does not vary.

In Step S220, the CPU 22 carries out a JPEG compression processing. The JPEG compression is encoding which is composed of a combination of DCT, quantization and Huffman coding; and, the JPEG compression is carried out in each block which is composed of horizontal direction 8 pixels× vertical direction 8 pixels. For the quantization, there is applied a given quantization table which is previously specified or a quantization table corresponding to a target size after execution of the processing. By the way, as described above, the compression algorithm is not limited to the JPEG but there can be used any type of algorithm, provided that it can encode the data in each block.

The block data, which have been JPEG compression processed, are stored accumulatively into the other region of the RAM 14 (the other region than the region into which the block data before execution of the JPEG compression are stored) by executing repetitively the processings in Steps from S208 to S220. In a state where the processings in Steps from S208 to S220 have been repetitively executed up the final block (a state to be "Yes" judged in Step S222), in the other region of the RAM 14, as shown in S5 in FIG. 5, there are held the whole of the image data which have been generated from the RAW data and also on which the JPEG compression processings have been enforced.

In Step S224, the CPU 22 arranges a file format of the image data, on which the JPEG compression processing has been enforced, into an Exif format, executes an output processing to the removal memory 10, and, at the time of completion of the output processing to the removal memory 10, removes the files of the Exif format that have been provisionally held in the RAM 14. Specifically, like a quantization table, information necessary for expansion of images to be printed, photograph information (date of photograph, stop, shutter speed and the like), print control information, image correction control information in order to obtain a desired print result and other information are stored into the file header as attribute information. Since the images to be printed are stored into the removable memory 10 according to the convenience of the printer 1, which has generated the images, regardless of the intension of a user, preferably, the attribute of the file may be set as a "hidden file". By the way, to the file header of the images to be printed, there may also be added information on the images on which the color balance correction or luminance correction has been enforced.

2-2. Image Print Processing

FIG. 4 is a flow chart of the details of the flow of the image print processing.

Processings shown in FIG. 4 are also processings which are executed when images arranged on the JPEG format or the like are selected as images to be printed. That is, the printer 1 according to the present embodiment executes an image print processing using the same software resources and hardware resources whether the objects to be printed are the RAW data or images. As a result of this, the developing time of the printer 1 can be shortened and the manufacturing and developing costs thereof can be restricted.

In Step S300, the CPU 22 analyzes the attribute information (file header) of the images to be printed which are objects to be printed, specifies information necessary for expansion of the images to be printed, photograph information, print control information, image correction control information in order to obtain a desired print result, file size and other information, and, based on these pieces of information specified, sets a control value necessary for printing of the images to be printed. Specifically, for example, the CPU 22 sets a quantization table, a control value for a sharpness correction processing, a control value for a color balance correction processing, a control value for a tone correction processing, a control value for a memory color correction processing, the number of copies to be printed, the size of paper to be printed, the printing resolution, and other similar information. By the way, as the print control information, there may also be used DPOF information or the like which corresponds to the images to be printed and, of course, the user may also be allowed to set control values for the print size, printing resolution and the like through the operation unit 26.

Figure 6:
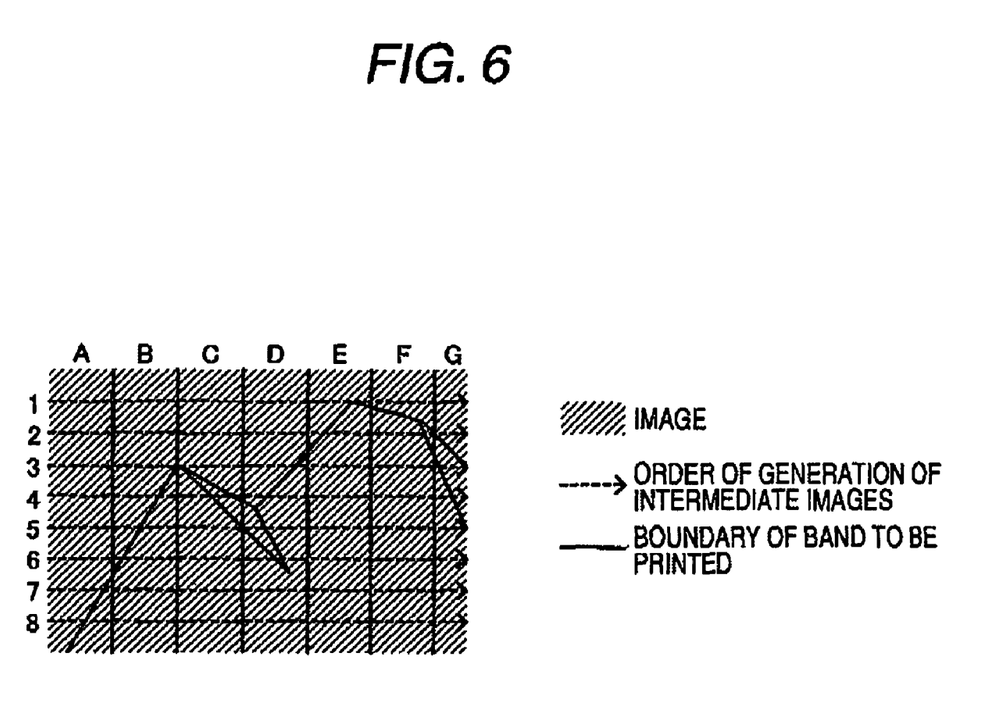
FIG. 6 is a typical view of an embodiment according to the invention.

Processings in Steps from S302 to S310 (which will be discussed below in detail) are carried out in a print target band unit. That is, in the first step S302, compressed data in a band to be printed are read from the removable memory 10 into the CPU 22 and the processed results thereof are stored into the RAM 14; and, in the respective following steps, the band data to be printed are read from the RAM 14 into the CPU 22 and the processed results thereof are stored into the RAM 14. The band to be printed can be set according to the direction of printing. For example, as shown in FIG. 6, when images to be printed respectively long sideways are sequentially printed in the horizontal direction of the images (in the direction where the band to be printed is processed in the order of A to G), that is, when, the images, which have been turned 90 degrees in order that the horizontal direction of the images to be printed can coincide with the feeding direction of paper, are printed, the band to be printed is set long in the vertical direction of the images. In this case, as shown in FIG. 6, the generating order of the images to be printed (the horizontal direction expresses the order shown by a broken-line arrow mark, while the vertical direction expresses the numerical order) is different from the printing order of the images to be printed; and, therefore, the generation of the images to be printed and the printing of the images to be printed cannot be processed sequentially in a serial manner. Owing to this, in this case, the whole of the images to be printed must be held statically in a memory space. However, assuming that the images to be printed are generated without being compressed, in a state shown in S2 in FIG. 5, the images to be printed are to be held in the RAM 14. In printing, because the images to be printed serving as source information and the print data serving as output information must be held in the RAM 14 at the same time, the necessary capacity of the RAM 14 should be fairly large. In view of this, according to the present embodiment, the memory resource is saved by generating the compressed images to be printed. In addition to this, according to the present embodiment, by holding the compressed images to be printed in the removable memory 10, the capacity of the RAM 14 to be mounted in the printer 1 can be made substantially the same as a printer which does not correspond to the RAW data.

By the way, the above-mentioned advantageous effect is not limited to a case when the images are printed while they are rotated. For example, even when analyzing the whole images in order to set an image correction control value, the effect of compression of the images to be printed can act advantageously. Also, even when the destination of the images to be printed is a device having a low data transfer speed such as a hard disk device, or even when the communication speed between the printer 1 and an external destination device is low, the compression effect of the images to be printed works advantageously.

In Step S302, the CPU 22 reads therein block data within a band to be printed sequentially from the removable memory 10 and expands them, and stores the resultant YCbCr images within the band to be printed into the RAM 14. As a result of this, the data of the band to be printed, which are held by the RAM 14, provide a state shown in S6 in FIG. 5.

In Step S304, the CPU 22 checks whether a color balance correction or a luminance correction has been executed or not. Specifically, for example, the completion of the execution of such correction may be transmitted through an API closed within the printer 1, or, as described above, the images may be recorded into the file header of the images to be printed and the completion of the execution of such correction may be checked according to the file analysis in Step S300. When the correction has been completed, the CPU 22 does not execute a color balance correction or a luminance correction on the images, thereby being able to prevent the deteriorated image quality and the increased processing time which can be caused by the double execution of the color balance correction or luminance correction.

In Step 5306, the CPU 22, when the above-mentioned correction has not been executed, executes a color balance correction or a luminance correction on the images. Specifically, the CPU 22 analyzes the images in the above-mentioned manner and sets a color balance operation value (a second color balance operation value) and a luminance operation value (a second luminance operation value) for each of the RGB components. Based on the thus set color balance operation value and luminance operation value, the CPU 22 enforces a color balance correction processing and a luminance correction processing on the images. The images to be correction processed may be the YCbCr images shown in S6 in FIG. 5 or may be images which, as shown in S7, have been color space transformed from the YCbCr color space to the RGB color space. By the way, the second color balance operation value and second luminance operation value may be set with the characteristics of the printer 1 added thereto.

In Step S308, the CPU 22 cooperates together with the image processing unit 16 in enforcing other image correction processings. Specifically, the CPU 22 enforces a resolution conversion processing, a sharpness correction processing, a contrast correction processing, a color saturation correction processing, a memory color correction processing and the like to which the control values set in Step S300 are applied respectively. When the automatic correction function is set on (in this case, the contrast, color saturation and memory color of the image are to be corrected), based on the control values set in Step S300 and the analyzed results of the images, the CPU 22 executes a sharpness correction processing, a contrast correction processing, a color saturation correction processing, a memory color correction processing and the like. The resolution conversion processing is a processing which converts the resolution of the image according to the print resolution set in Step S300. The sharpness correction processing is executed after execution of the resolution conversion and, in this processing, there is applied a control value while the lowered sharpness due to the low pass filter of an image input device such as a digital camera or the like is taken into account. When a resolution conversion processing is enforced on the image on which a sharpness correction processing has been enforced, there is a tendency that the quality of the image is deteriorated. According to the present embodiment, since the sharpness correction processing is not executed before execution of the resolution conversion processing, the quality of the printed images can be enhanced. The contrast correction processing, memory color correction processing, color saturation processing and the like may be executed after or before execution of the resolution conversion processing.

In Step S310, the CPU 22 generates the print data (S8 in FIG. 5) of a band to be printed from the image of the band to be printed, and the print unit 18 executes printing based on the print data.

When the processings in Steps from S302 to S306 have been completed up to the final band to be printed (when "Yes" is judged in Step S308), the CPU 22 allows the RMC 12 to remove the images to be printed held in the removal memory 10 (Step S310). The removal of the images to be printed after execution of the printing can prevent a possibility that images to be printed, which are generated regardless of the intension of a user, can consume the memory area of the removable memory 10 uselessly.

According to the present embodiment, description has been given of an example in which, as the images to be printed, there are used images which are compressed according to the JPEG format. However, there may also be used a file format (for example, a BMP format or a TIFF format) which handles uncompressed images as the images to be printed. In this case, since there is eliminated the deteriorated quality of images caused by compressing the images, the images can be printed with higher quality.

According to the present embodiment, description has been given of an example in which the RAW data are selected as the objects to be printed and, when the automatic correction function is on, a color balance correction processing and a luminance correction processing are enforced on the RAW data before the demosaicking processing is enforced on the RAW data. However, in addition to the color balance processing and luminance processing, a memory color correction processing, a contrast correction processing, a black and white point correction processing and the like may also be enforced on the RAW data before execution of the demosaicking processing. In this case, with the characteristics of the printer 1 (the kinds of ink such as pigment ink and dye ink, the paper quality of printing paper such as ordinary paper and glossy paper) taken into account the respective correction parameters are set. For example, for the memory color correction, as the characteristic of the printer 1, when cobalt blue develops well, there is set a parameter for memory color correction in such a manner to expand the tone range of cobalt blue but restrict the tone ranges of other colors which develop poor. For the black and white point correction, similarly, when noises are easy to occur on black or white due to the characteristics of the printer 1, by restricting the tone range of black or white and by expanding the tone ranges of other colors, the images can be printed with more sharpness. Also, with regard to the paper quality of the printing paper, for example, when images are printed on ordinary paper, the parameter for contrast correction may be set in such a manner that the contrast of the images can be increased when compared with a case where the images are printed on glossy paper. To enforce a color balance correction processing, a luminance correction processing, a memory color correction processing, a black and white point correction processing, a contrast correction processing and the like at the stage of the RAW data is useful in that the images can be corrected by making full use of the gamut of the color range that the printer 1 can reproduce.

Also, description has been given heretofore of an embodiment in which the invention is applied to a printer of a stand-alone type as an image forming apparatus. However, the invention may also be applied to a personal computer which executes an RAW developing application and a printer driver program.

What is claimed is:

1. A printer, comprising:
an input unit that inputs RAW data;
a correct unit that analyzes attribute information of the RAW data to specify development control information including pre-gain information and optical black information, executes a pre-gain processing and an optical black compensation processing on the RAW data based on the pre-gain information and the optical black information, setting a color balance operation value based on the RAW data, and enforcing a white balance correction corresponding to the color balance operation value on the RAW data;
an image data generating unit that carries out a demosaicking processing and a tone reproduction processing on the RAW data after the white balance correction is enforced on the RAW data to obtain intermediate image data, carries out a subtractive color processing on the intermediate image data, and carries out a JPEG compression processing on the intermediate image data to obtain image data, wherein the image data generating unit stores the image data in an external storage;
a print data generating unit that reads image data from the external storage, carries out a JPEG expansion processing on the image data, determining whether the white balance correction has been enforced on the image data based on information obtained from the image data generating unit, sets a color balance operation value based on the image data and enforces a white balance correction corresponding to the color balance operation value on the image data if the white balance correction has not been enforced on the image data, and then generates print data from the image data; and
a print unit that executes printing based on the print data.

2. An image processing method in a printer, comprising:
a) inputting RAW data;
b) analyzing attribute information of the RAW data to specify development control information including pre-gain information and optical black information, after the step a);
c) executing a pre-gain processing and an optical black compensation processing on the RAW data based on the pre-gain information and the optical black information, after the step c);
d) setting a color balance operation value based on the RAW data, after the step c)
e) enforcing a white balance correction corresponding to the color balance operation value on the RAW data, after the step d);
f) carrying out a demosaicking processing on the RAW data, after the step e);
g) carrying out a tone reproduction processing on the RAW data to obtain intermediate image data, after the step f);
h) carrying out a subtractive color processing on the intermediate image data, after the step g);
i) carrying out a JPEG compression processing on the intermediate image data to obtain image data, after the step h);
j) storing the image data in an external storage, after the step i);
k) reading image data from the external storage, after the step j);
l) carrying out a JPEG expansion processing on the image data, after the step k);
m) determining whether the white balance correction has been enforced on the image data, after the step l);
n) setting a color balance operation value based on the image data and enforcing a white balance correction corresponding to the color balance operation value on the image data, after the step m) if the white balance correction has not been enforced on the image data;
o) generating print data from the image data and executing printing based on the print data, after the step m) or the step n).

3. A computer-readable medium storing a computer-executable program which, when executed by a computer, performs the method as set forth in claim 2.

* * * * *